(12) United States Patent
Yang

(10) Patent No.: US 11,657,574 B2
(45) Date of Patent: *May 23, 2023

(54) SYSTEMS AND METHODS FOR PROVIDING AN AUDIO-GUIDED VIRTUAL REALITY TOUR

(71) Applicant: REALSEE (BEIJING) TECHNOLOGY CO., LTD., Beijing (CN)

(72) Inventor: Yuke Yang, Beijing (CN)

(73) Assignee: REALSEE (BEIJING) TECHNOLOGY CO., LTD., Beijing (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/553,723

(22) Filed: Dec. 16, 2021

(65) Prior Publication Data

US 2022/0108530 A1     Apr. 7, 2022

Related U.S. Application Data

(63) Continuation of application No. 16/425,945, filed on May 30, 2019, now Pat. No. 11,227,440.

(30) Foreign Application Priority Data

May 30, 2018 (CN) .......................... 201810538662.2
May 30, 2018 (CN) .......................... 201810539141.9

(51) Int. Cl.
*G06T 19/00* (2011.01)
*G06F 3/16* (2006.01)
*G06T 7/73* (2017.01)

(52) U.S. Cl.
CPC ............ *G06T 19/003* (2013.01); *G06F 3/165* (2013.01); *G06F 3/167* (2013.01); *G06T 7/75* (2017.01); *G06T 19/006* (2013.01)

(58) Field of Classification Search
None
See application file for complete search history.

(56) References Cited

U.S. PATENT DOCUMENTS 6,224,387 B1    5/2001  Jones
10,296,277 B2   5/2019  Carlos et al.
(Continued)

FOREIGN PATENT DOCUMENTS

CN    107301679 A    10/2017
CN    108011905 A     5/2018
KR    101494810 B1    2/2015

OTHER PUBLICATIONS

First Office action issued in related Chinese Application No. 201810539141.9, dated Mar. 25, 2019, 7 pages.
(Continued)

*Primary Examiner* — Andrew G Yang
(74) *Attorney, Agent, or Firm* — Bayes PLLC

(57) ABSTRACT

Systems and methods are provided for providing an audio-guided in-door virtual reality (VR) tour. An exemplary system may include a communication interface configured to receive input from a user and to output media contents, a memory storing computer-readable instructions, and at least one processor coupled to the communication interface and the memory. The computer-readable instructions, when executed by the processor, may cause the at least one processor to perform operations. The operations may include displaying a view of a 3D VR environment and playing an audio guide associated with the view. The operations may also include detecting, during the playing of the audio guide, a target operation input by the user to alter the view. In response to the detection of the target operation, the operations may include adjusting, based on the detected
(Continued)

target operation, the view with respect to a fixed point position within the 3D VR environment.

20 Claims, 7 Drawing Sheets

(56) References Cited

U.S. PATENT DOCUMENTS

| | | |
|---|---|---|
| 10,643,386 B2 | 5/2020 | Li et al. |
| 2002/0146674 A1 | 10/2002 | Betz et al. |
| 2005/0273354 A1 | 12/2005 | Adams |
| 2006/0055534 A1 | 3/2006 | Fergusson |
| 2008/0252640 A1 | 10/2008 | Williams |
| 2010/0245257 A1 | 9/2010 | Cragun et al. |
| 2011/0007069 A1 | 1/2011 | Lee |
| 2012/0124471 A1 | 5/2012 | Gusky |
| 2012/0162253 A1 | 6/2012 | Collins |
| 2012/0219935 A1 | 8/2012 | Stebbings |
| 2013/0271457 A1 | 10/2013 | Haswell |
| 2013/0271462 A1 | 10/2013 | Frank |
| 2014/0248911 A1 | 9/2014 | Rouda, Jr. |
| 2016/0034978 A1 | 2/2016 | King |
| 2016/0110916 A1 | 4/2016 | Eikhoff |
| 2016/0260253 A1 | 9/2016 | Reddy et al. |
| 2016/0350977 A1 | 12/2016 | Doronichev et al. |
| 2016/0364915 A1 | 12/2016 | Smith et al. |
| 2017/0054735 A1 | 2/2017 | Moretti et al. |
| 2017/0316603 A1 | 11/2017 | Sun |
| 2018/0143756 A1 | 5/2018 | Mildrew et al. |
| 2018/0250589 A1 | 9/2018 | Cossairt et al. |
| 2019/0101758 A1 | 4/2019 | Zhu et al. |
| 2019/0212151 A1 | 7/2019 | Parker |

OTHER PUBLICATIONS

Second Office action issued in related Chinese Application No. 201810539141.9, dated Apr. 26, 2019, 7 pages.

First Office action issued in related Chinese Application No. 201810538662.2, dated Jun. 20, 2019, 6 pages.

Decision of Rejection issued in related Chinese Application No. 201810539141.9, dated Jun. 3, 2019, 11 pages including English translation.

Second Office action issued in related Chinese Application No. 201810538662.2, dated Aug. 12, 2019, 17 pages.

Decision of rejection issued in related Chinese Application No. 201810538662.2, dated Nov. 11, 2019, 17 pages.

SYSTEMS AND METHODS FOR PROVIDING AN AUDIO-GUIDED VIRTUAL REALITY TOUR

RELATED APPLICATIONS

This application is a continuation of U.S. patent application Ser. No. 16/425,945, filed May 30, 2019, which claims the benefits of priority to Chinese Application Nos. CN 201810538662.2, filed May 30, 2018 and CN 201810539141.9, filed May 30, 2018. The entire contents of the above-identified applications are expressly incorporated herein by reference.

TECHNICAL FIELD

The present application relates to virtual reality (VR) technologies. More specifically, the present application relates to systems and methods for providing an audio-guided VR tour in an in-door environment.

BACKGROUND

Conventional real estate sales rely on distribution of paper pamphlets and advertisement through newspaper and other paper-based media channels. These off-line advertising methods suffer from low efficiency and limited customer base. Promoting real estate sales on-line has become popular thanks to the proliferation of Internet and network-connected mobile devices. Real estate information augmentation services may collect for-sale information and distribute such information to subscribers through mailing list or publish the information on websites or mobile app portals. While the on-line approach improves the timeliness and reaches a larger audience, the contents delivered on-line remain largely the same as their off-line counterparts. For example, a typical on-line real estate advertisement includes a set of photos of the subject property and some textual descriptions. In order to gain more detailed knowledge about the property, such as specific parts not covered or insufficiently depicted by the photos, a visit to the property would normally be required. In addition, the textual descriptions are often provided in the form of a laundry list, lacking context to specific features of the underlying real estate property.

Embodiments of the present disclosure improve the user experience in exploring and virtually touring real estate properties by providing audio-guided VR tours.

SUMMARY

In one aspect, a system is provided for providing an audio-guided in-door VR tour. The system may include a communication interface configured to receive input from a user and to output media contents, a memory storing computer-readable instructions, and at least one processor coupled to the communication interface and the memory. The computer-readable instructions, when executed by the at least one processor, may cause the at least one processor to perform operations. The operations may include displaying, through the communication interface, a view of a three-dimensional (3D) VR environment. The operations may also include playing, through the communication interface, an audio guide associated with the view. The operations may further include detecting, during the playing of the audio guide, a target operation input by the user to alter the view. In response to the detection of the target operation, the operations may include adjusting, based on the detected target operation, the view with respect to a fixed point position within the 3D VR environment.

In another aspect, a method is provided for providing an audio-guided in-door virtual reality (VR) tour. The method may include displaying, through a communication interface, a view of a three-dimensional (3D) VR environment. The method may also include playing, through the communication interface, an audio guide associated with the view. The method may further include detecting, during the playing of the audio guide, a target operation input by a user to alter the view. In response to the detection of the target operation, the method may include adjusting, based on the detected target operation, the view with respect to a fixed point position within the 3D VR environment.

In a further aspect, a non-transitory computer-readable medium is provided. The non-transitory computer-readable medium may store instructions that, when executed by at least one processor, cause the at least one processor to perform a method for providing an audio-guided in-door virtual reality (VR) tour. The method may include displaying, through a communication interface, a view of a three-dimensional (3D) VR environment. The method may also include playing, through the communication interface, an audio guide associated with the view. The method may further include detecting, during the playing of the audio guide, a target operation input by a user to alter the view. In response to the detection of the target operation, the method may include adjusting, based on the detected target operation, the view with respect to a fixed point position within the 3D VR environment.

It is to be understood that both the foregoing general description and the following detailed description are exemplary and explanatory only and are not restrictive of the invention, as claimed.

DETAILED DESCRIPTION

Reference will now be made in detail to the exemplary embodiments, examples of which are illustrated in the accompanying drawings. Wherever possible, the same reference numbers will be used throughout the drawings to refer to the same or like parts.

Figure 1:
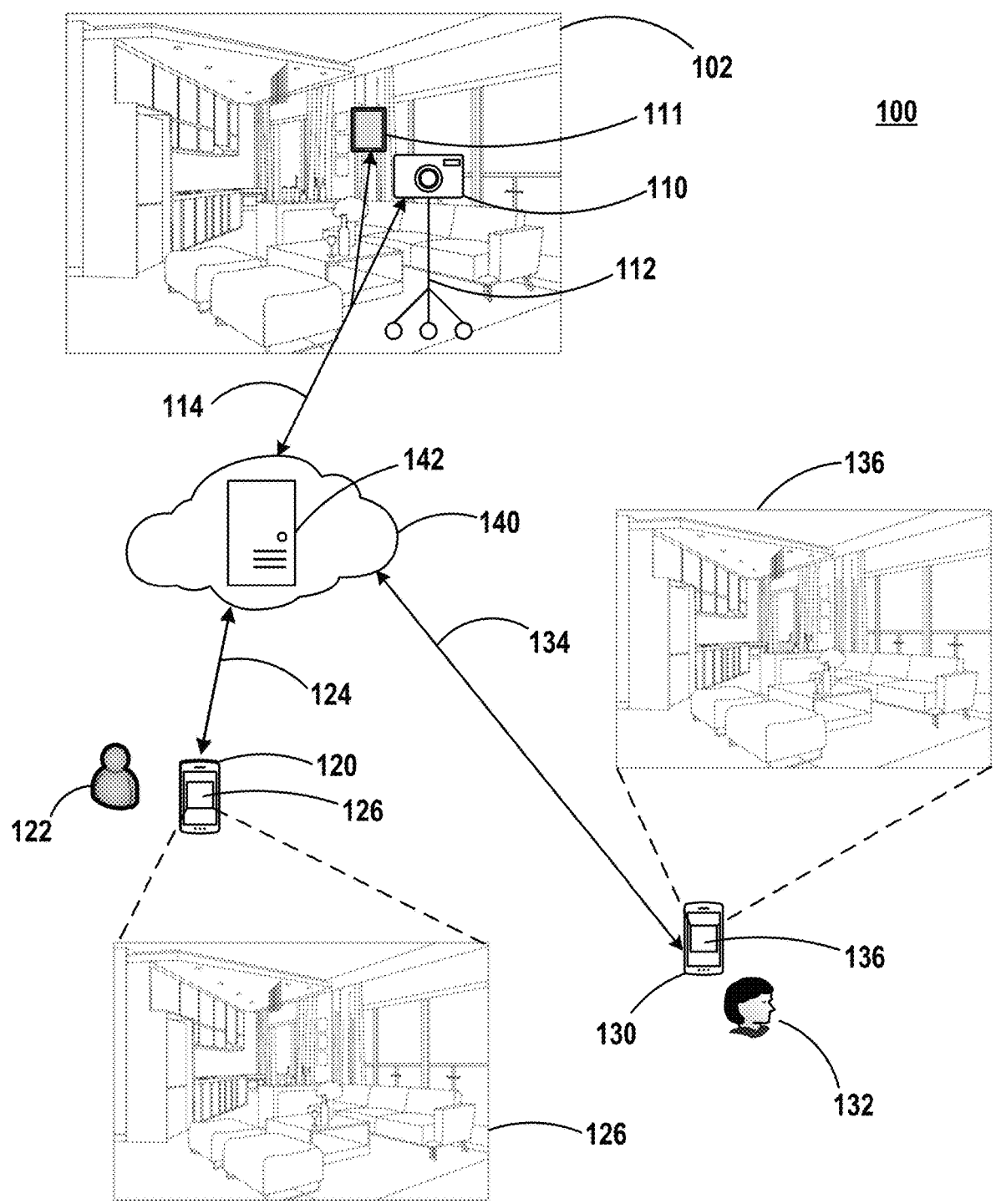
FIG. 1 illustrates an exemplary system for providing an in-door VR tour, according to embodiments of the disclosure.

FIG. 1 illustrates an exemplary system 100 for providing an in-door VR tour, according to embodiments of the disclosure. System 100 may include a data capturing portion, a data processing portion, and a VR displaying portion.

The data capturing portion may include a camera device 110 configured to capture images of an in-door environment 102, which may include enclosed or partially-enclosed space, such as one or more rooms of a residential or commercial real estate property, passenger or cargo space of a vessel (e.g., car, truck, recreational vehicle, trailer, train, ship, plane, etc.), a hall/suite/room of a cultural, political, industrial, or business establishment, etc. In-door environment 102 may include fixtures (e.g., lights, fans, cabinets, closets, etc.), structures (furniture, decorations, etc.), or other features. In some embodiments, in-door environment 102 may include part of a real estate property that may be for sale or rent. For example, the example shown in FIG. 1 depicts a living room of an apartment, house, or office building. Embodiments of the disclosure may create a 3D model of in-door environment 102 to facilitate the provision of a VR tour of the in-door environment. For example, multiple images of in-door environment 102 may be captured, aligned, and combined to recreate or reconstruct a 3D representation of the in-door environment 102. In some embodiments, range, depth, or distance information may also be acquired to aid in creating the 3D model.

In some embodiments, camera device 110 may be configured to capture images of in-door environment 102. The image data captured by camera device 110 may include static images or photos, motion images or videos, 3D images including range, depth, or distance information, or any combination thereof. For example, camera device 110 may include a specially designed VR camera or 3D camera configured to capture 3D images having range/depth/distance information. In this case, camera device 110 may include multiple lenses. One or more of the lenses may be configured to capture the color or intensity information, while one or more other lenses may be configured to capture the range/depth/distance information. The color/intensity information and range/depth/distance information may be stored locally in a memory of camera device 110, transmitted to an accompanying mobile device 111 located in the proximity to the camera device, and/or streamed to a remote server, such as server 142 located in a cloud computing service 140, which will be discussed in greater detail below. For example, when mobile device 111 is used, image data captured by camera device 110 may be transmitted to mobile device 111, where the image data may be preprocessed, including, for example, aligning and/or combining point cloud data captured at different shooting angles or positions, adding one or more feature points such as those on windows or mirrors, and conditioning the image data for transmission, such as streaming, dividing into packets, and/or compressing the image data.

In some embodiments, camera device 110 may include a camera not specifically designed to acquire 3D model data, such as a general-purpose digital camera, a camera equipped on a mobile device (e.g., a smart phone camera, a tablet camera, a laptop camera, etc.), a webcam, an action/sports camera, a panorama or 360-degree camera, or the like. In this case, images captured by camera device 110 may be aligned and combined based on feature recognition, image registration, machine learning, or other suitable techniques to convert multiple patches of 2D images into a 3D model.

In some embodiments, camera device 110 may include, separate from the image capturing device, a range device such as a light-based sensor (e.g., infra-red, laser, etc.) to acquire range/depth/distance information, which may be associated with 2D images captured by camera device 110 to create a 3D model.

As shown in the example of FIG. 1, camera device 110 may be installed on a stand 112. In some embodiments, stand 112 may include a tripod or similar supporting structures. Camera device 110 may be coupled to stand 112 through mounting, screwing, magnetically attaching, or any suitable mechanism to physically associate with stand 112.

In some embodiments, camera device 110 may be rigidly associated with stand 112. For example, the connection between camera device 110 and stand 112 may not allow significant movement of camera device 110 relative to stand 112. In some embodiments, camera device 110 may be flexibly associated with stand 112. For example, camera device 110 may be connected to stand 112 via a ball head, pan head, gimbal, CV-joint, track, slider, etc., to allow movement (e.g., tilt, pan, linear motion, or the like) of camera device 110 relative to stand 112. In some embodiments, motion of camera device 110 may be manually or remotely controlled by an operator. In some embodiments, motion of camera device 110 may be automatically controlled by a motorized mechanism and may be based on a predetermined routine or feedback from the captured information.

In some embodiment, stand 112 may be equipped with a motion mechanism to move around. For example, stand 112 may include wheels or similar structures to allow movement within in-door environment 102. Stand 112 may be motorized to propel itself. For example, stand 112 may be mounted on or integrated with a motorized base, cart, or robotic platform. In some embodiments, the motion of stand 112 may be controlled by an operator. In some embodiments, the motion of stand 112 may be automatically controlled based on a predetermined routine or feedback from the captured information.

In some embodiments, stand 112 may be omitted. For example, camera device 110 may be placed directly on any suitable surface or held by a user during an image capturing process.

The captured image data of in-door environment 102 may be processed by the data processing portion of system 100. In some embodiments, the data processing portion may include a cloud computing service (also referred to as cloud service or simply cloud) 140 comprising one or more servers 142 (hereinafter collectively referred to as server 142). Image data captured by camera device 110 may be transmitted to cloud 140 via a communication channel 114. In some embodiments, communication channel 114 may include a wired or physical connection, such as a data cable or card reader. In some embodiments, communication channel 114 may include a wireless connection, such as a wireless local area network (WLAN) connection, Bluetooth connection, telecommunication link (e.g., 3G, 4G, 5G, etc.), or the like. In some embodiments, when mobile device 111 is used to process the image data captured by camera device 110, mobile device 111 may be part of the data processing portion. In this case, communication channel 114 may be between mobile device 111 and cloud 140 in addition to or instead of between camera device 110 and cloud 140.

Server 142 may include data processing devices to process the image data received from camera device 110 and/or mobile device 111. For example, the image data may include multiple images of in-door environment 102 captured at multiple locations and/or multiple shooting angles. The multiple images may include high-definition color photos, sometimes with multiple exposure levels, of features in the in-door environment 102. The multiple images may also include or be associated with 3D range data (e.g., 3D point cloud data) and/or geographical information (e.g., GPS information) of in-door environment 102. Based on the image data, server 142 may map the features contained in the images as well as image textures and details to a 3D model representing the in-door environment 102 using techniques such as automatic model creation, intelligent hole filling, automatic data extraction, and high-dynamic range (HDR) optimization. In this way, in-door environment 102 can be reconstructed in virtual reality to allow users to explore, examine, and experience the features of in-door environment 102 in high fidelity without being physically present therein. In some embodiments, part or all of the data processing may be performed by mobile device 111. For example, mobile device 111 and server 142 may work in tandem to process the image data captured by camera device 110.

Viewing or touring the reconstructed in-door environment 102 can be accomplished through various ways, such as using a terminal device. For example, as shown in FIG. 1, a user 122 may use a terminal device 120 to view or virtually tour the VR version of the in-door environment (referred to as VR environment 126) displayed on terminal device 120. In some embodiments, terminal device 120 may communicate with cloud 140 to exchange information about displaying VR environment 126. For example, data related to the VR environment 126, such as the 3D model of in-door environment 102, color information, texture information, spatial relationship among various features/objects, and one or more default view points, view angles, and/or filed of views may be transmitted from cloud 140 to terminal device 120 via a communication channel 124. User 122 may manipulate the view point, view angle, and field of view in the VR environment 126 to explore various features, for example to virtually "move" along a route to change the view point, pan/tilt to change the view angle, and zoom in/out to change the field of view. These manipulations may be fed back to cloud 140 via communication channel 124 to update the content of the VR environment 126 displayed on terminal device 120. Communication channel 124 may include any suitable wired or wireless connections between cloud 140 and terminal device 124, such as a broadband connection (e.g., via WLAN, LAN, and/or short-range communication links such as Bluetooth), a telecommunication link (e.g., 3G, 4G, 5G, etc.), or the like.

VR environment 126 displayed on terminal device 120 may be enriched with various enrichment data. For example, audio description or guidance (referred to as audio guide) may be added to VR environment 126 to enrich the user experience. The audio guide may include a recorded voice guidance to introduce features of in-door environment 102, background information, or other information to assist user 122 in understanding the features or characteristics of in-door environment 102. In another example, video demonstration may be provided to showcase certain features displayed in VR environment 126. In yet another example, one or more spatial operations altering the view of the VR environment 126 may be added to direct the user's attention to specific aspects of VR environment 126. Exemplary spatial operations may include panning, tilting, zooming, sliding or moving in any suitable manner, etc. These multimedia contents enrich the VR environment 126 by engaging user 122 with additional layers of interactions, thereby improving the user experience.

Enrichment data such as audio description, video demonstration, and spatial operations altering the view of the VR environment 126 may be added by a user 132. In some embodiments, user 132 may have a role falling within a predetermined authorization group, such as a realtor, an owner or manager of a real estate property, or the like. User 132 may operate a terminal device 130 to create enrichment data or upload pre-created enrichment data to cloud 140. For example, terminal device 130 may display a 3D VR environment 136 (also referred to as VR environment 136 or environment 136 for simplicity) that may be similar to VR environment 126 but may include additional interface elements configured for creating or adding enrichment data. When user 132 is navigating through VR environment 136, a user indicator, which may or may not be visible in VR environment 136, may be used to determine the field of view depicted on terminal device 130. For example, the user indicator may be represented by a point position within VR environment 136 simulating the position where user 132 is virtually located within VR environment 136 and/or a view direction toward which user 132 faces. The point position of the user indicator may coincide with the view point at which the view of the VR environment 126/136 displayed on terminal device 120/130 is perceived or observed. In some embodiments, the point position may correspond to the location at which the image data of in-door environment 102 is captured. For example, camera device 110 may be placed at a spatial location within in-door environment 102 to capture image data, which may be used to reconstruct the 3D model of in-door environment 102. When the 3D model is displayed to user 120/130 in the form VR environment 126/136, user 120/130 may be presented with a view of the VR environment as if the user is standing at the same spatial location of camera device 110 and to observe what camera device 110 can capture. In some embodiments, whether the user indicator is within VR environment 136 or not may indicate whether user 132 engages or experiences VR environment 136.

Terminal device 130 may communicate with cloud 140 via communication channel 134, which may be similar to communication channel 124. Enrichment data created or uploaded by user 132 may be transmitted to cloud 140 via communication channel 134. After receiving the enrichment data, cloud 140, through server 142, may update the 3D model of in-door environment 102 stored thereon by adding the enrichment data, and provide the updated VR environment 126 to user 122.

Figure 2:
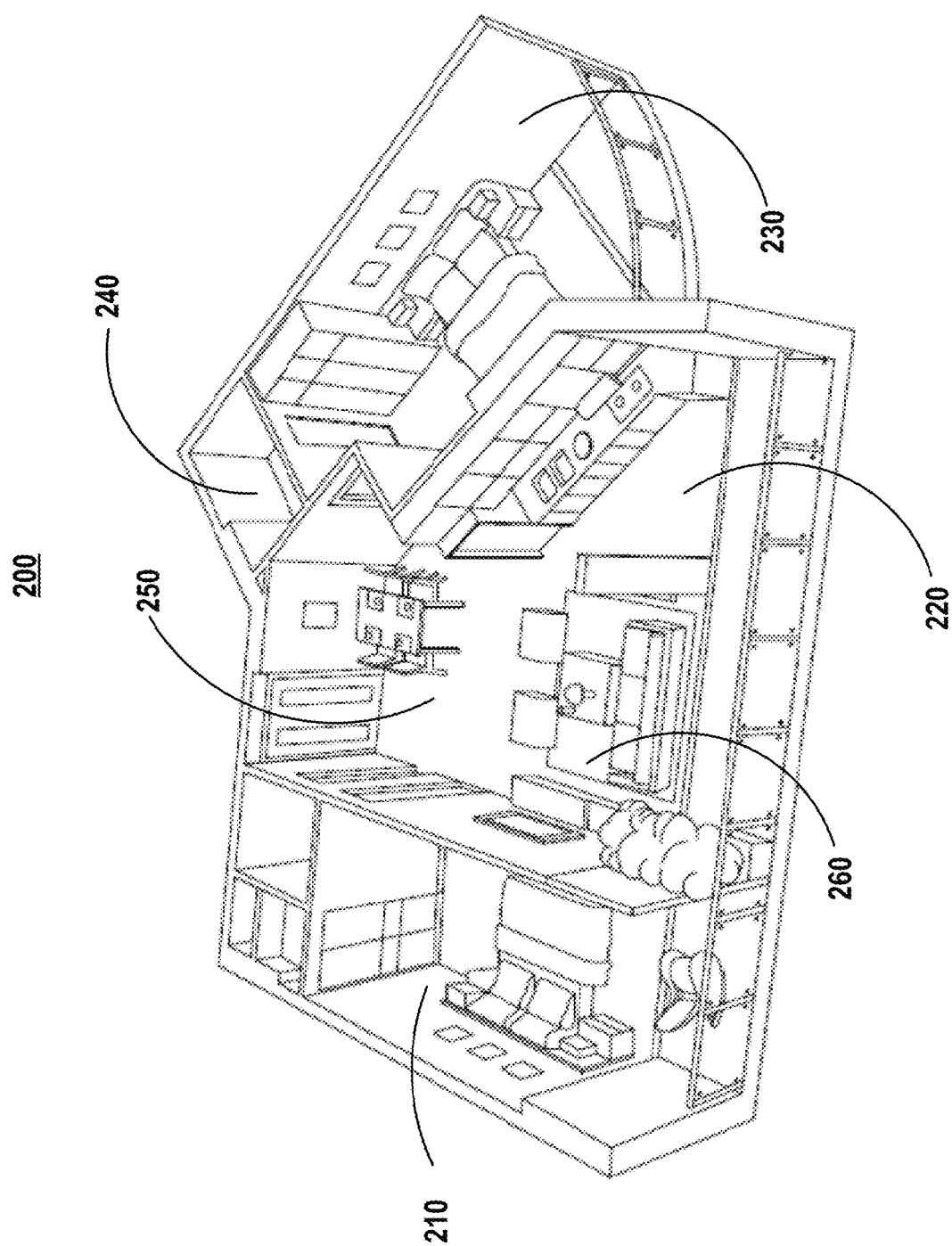
FIG. 2 illustrates an exemplary three-dimensional (3D) VR environment, according to embodiments of the disclosure.

FIG. 2 illustrates an exemplary 3D VR environment 200, according to embodiments of the disclosure. As shown in FIG. 2, 3D VR environment 200 may simulate or represent a residential unit, such as an apartment or house floor. It is noted that 3D VR environment 200 is not limited to the example shown in FIG. 2. Rather, 3D VR environment 200 may include a VR representation of any in-door space or environment. Referring to FIG. 2, 3D VR environment 200 may include one or more functional spaces, such as 210, 220, 230, 240, 250, and 260. As used herein, a functional space refers to an enclosed or partially enclosed space that is associated with a particular function. In some cases, a functional space may correspond to a room. For example, functional space 210 may correspond to a first bedroom, and functional space 230 may correspond to a second bedroom. In some cases, a functional space may correspond to an enclosed or partially enclosed space within or adjacent to a room. For example, functional space 240 may correspond to a closet. In some cases, a function space may correspond to an area that is generally used for a specific purpose. For example, functional space 220 may correspond to a kitchen area, functional space 250 may correspond to a dining area, and functional space 260 may correspond to a living room. Although functional spaces 220, 250, and 260 may share the same room (e.g., an enclosed area), they may be considered as different functional spaces due to their different functions.

Figure 3:
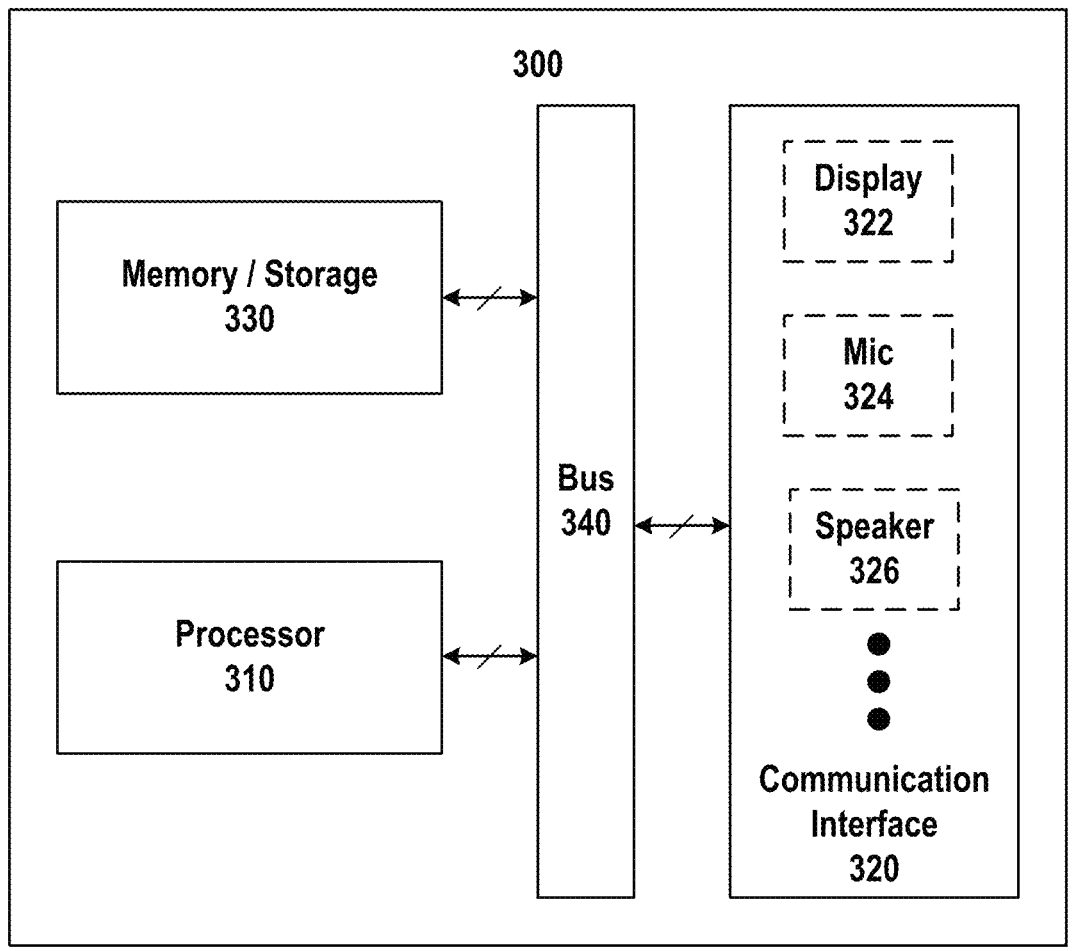
FIG. 3 illustrates a block diagram of an exemplary computer system configured to provide an in-door VR tour, according to embodiments of the disclosure.

FIG. 3 illustrates a block diagram of an exemplary computer system 300 configured to implement various functions disclosed herein. For example, computer system 300 may be configured as server 142 to create or reconstruct VR environment 126. In another example, computer system 300 may be configured as terminal device 120 or 130 to display or enrich VR environment 126/136. As shown in FIG. 3, computer system 300 may include a processor 310, a communication interface 320, a memory/storage 330, and a data bus 340. Memory/storage 330 may be configured to store computer-readable instructions that, when executed by processor 310, can cause processor 310 to perform various operations disclosed herein. Memory 330 may be any non-transitory type of mass storage, such as volatile or non-volatile, magnetic, semiconductor-based, tape-based, optical, removable, non-removable, or other type of storage device or tangible computer-readable medium including, but not limited to, a ROM, a flash memory, a dynamic RAM, and a static RAM.

Processor 310 may be configured to perform the operations in accordance with the instructions stored in memory 330. Processor 310 may include any appropriate type of general-purpose or special-purpose microprocessor, digital signal processor, microcontroller, or the like. Processor 310 may be configured as a separate processor module dedicated to performing one or more specific operations disclosed herein. Alternatively, processor 310 may be configured as a shared processor module capable of performing other operations unrelated to the one or more specific operations disclosed herein.

Communication interface 320 may be configured to communicate information between computer system 300 and other devices or systems. For example, communication interface 320 may include an integrated services digital network (ISDN) card, a cable modem, a satellite modem, or a modem to provide a data communication connection. As another example, communication interface 320 may include a local area network (LAN) card to provide a data communication connection to a compatible LAN. As a further example, communication interface 320 may include a high-speed network adapter such as a fiber optic network adaptor, 10G Ethernet adaptor, or the like. Wireless links can also be implemented by communication interface 320. In such an implementation, communication interface 320 can send and receive electrical, electromagnetic or optical signals that carry digital data streams representing various types of information via a network. The network can typically include a cellular communication network, a Wireless Local Area Network (WLAN), a Wide Area Network (WAN), or the like.

Communication interface 320 may also include various I/O devices such as a display 322, a microphone 324, a speaker or speaker module 326, a keyboard, a mouse, a touchpad, a touch screen, a camera, a biosensor, etc. User 122/132 may input data to and/or receive information from terminal device 120/130 through communication interface 320.

Display 322 may be integrated as part of computer system 300 or may be provided as a separate device communicatively coupled to computer system 300. Display 322 may include a display device such as a Liquid Crystal Display (LCD), a Light Emitting Diode Display (LED), a plasma display, or any other type of display, and provide a Graphical User Interface (GUI) presented on the display for user input and data depiction. In some embodiments, display device 322 may include a VR goggle, a pair of VR glasses, or other similar devices that provide immersive VR experience. For example, VR environment 126/136 may be displayed on display 322. In some embodiments, display 322 may be integrated as part of communication interface 320.

Microphone 324 may include any suitable audio input device configured to receive audio signals and convert the audio signals to electrical signals. For example, user 132 may record an audio guide through microphone 324 as part of the enrichment data.

Speaker (or speaker module) 326 may include any suitable audio output device. In some embodiments, speaker 326 may include an audio transducer to convert electrical signals to audio signals. In some embodiments, speaker 326 may take the form of a digital to analog converter to convert digital audio signals to analog signals, which can be further converted to audio signals by a separate audio transducer.

Data bus 340 may include any suitable communication medium configured to facilitate data exchange among components of computer system 300.

Figure 4A:
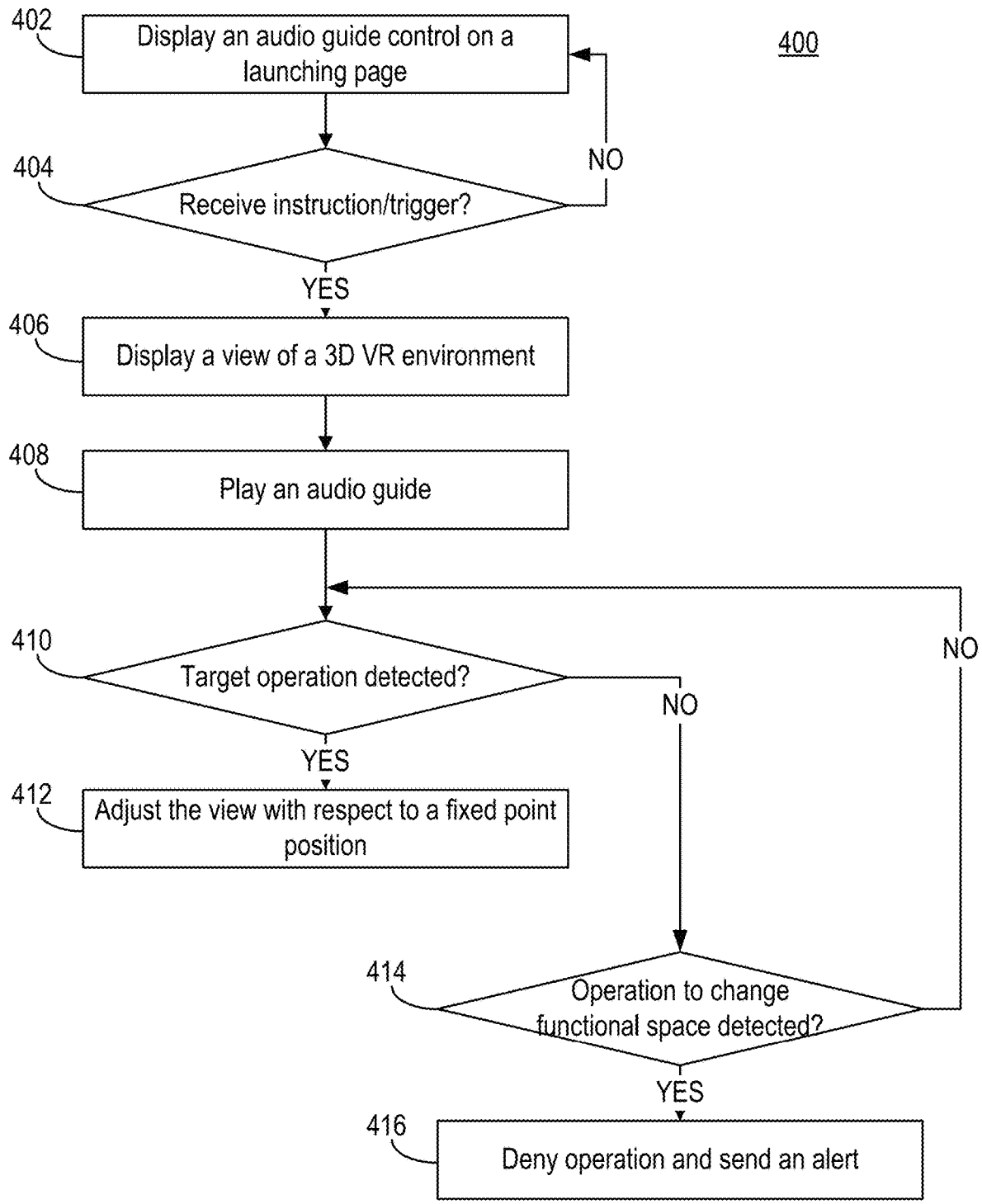
FIGS. 4A and 4B are flow charts of exemplary methods for providing an audio-guided in-door VR tour, according to embodiments of the disclosure.
Figure 5:
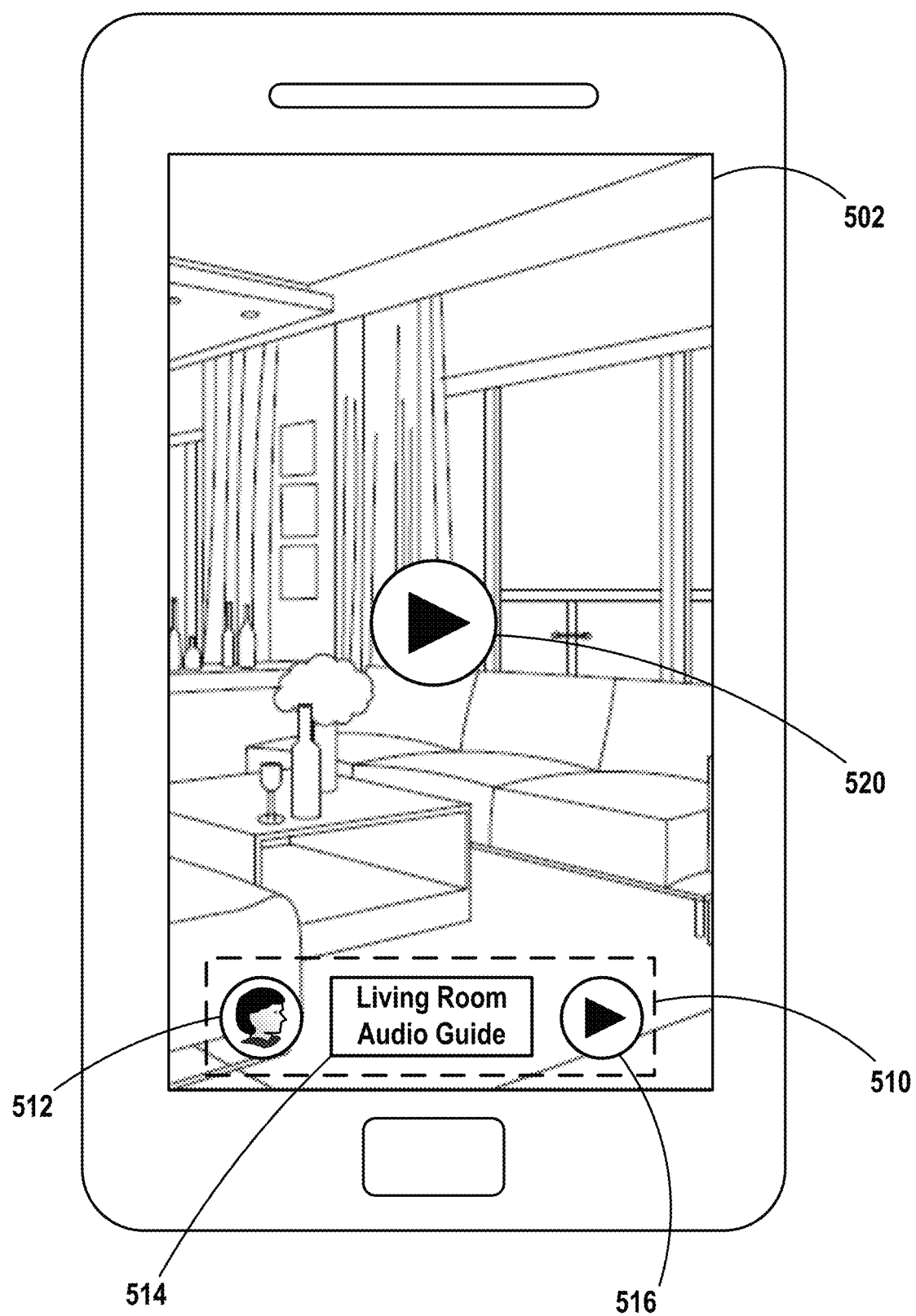
FIG. 5 illustrates an exemplary user interface for displaying a view of a 3D VR environment, according to embodiments of the disclosure.

FIG. 4A illustrates a flowchart of an exemplary method 400 for providing an audio-guided VR tour of an in-door environment (e.g., in-door environment 102), according to embodiments of the disclosure. In some embodiments, method 400 may be implemented by server 142. However, method 400 is not limited to that exemplary embodiment and may be implemented by terminal device 120/130 or jointly by server 142 and terminal device 120/130. As discussed above, server 142 and/or terminal device 120/130 may be implemented by computer system 300. Method 400 may include steps 402-416 as described below. It is to be appreciated that some of the steps may be optional to perform the disclosure provided herein. Further, some of the steps may be performed simultaneously, or in a different order than shown in. FIG. 5 illustrates an exemplary user interface for displaying a view of a 3D VR environment, according to embodiments of the disclosure. Method 400 will be de discussed together with FIGS. 3 and 5.

In step 402, processor 310 may, through communication interface 320 (e.g., display 322), display an audio guide control on a launching page of an audio-guided in-door VR tour. FIG. 5 illustrate an exemplary audio guide control 510 on an exemplary launching page 502, according to embodiments of the disclosure. As shown in FIG. 5, audio guide control 510 may include components such as a user profile icon 512 (e.g., an image, photo, or avatar of the audio guide narrator), an audio guide description 514, and/or a play button 516. In some embodiments, audio guide control 510 may include few components then the example shown in FIG. 5. For example, an alternative or additional play button 520 (may be used as an audio guide control by itself) may be provided on launching page 502. Launching page 502 may be an interface where a user can launch or start an audio-guided VR tour. For example, launching page 502 may be the first page shown to the user after the user select an in-door environment or a functional space of an in-door environment. Launching page 502 may include a photo, image, and/or VR representation associated with the audio-guided in-door VR tour and/or the underlying in-door environment or functional space. Displaying audio guide control 510/520 on launching page 502 allows the user to launch a VR tour quickly and conveniently, improving the user experience.

Processor 310 may generate audio guide control 510 by acquiring an audio file and corresponding VR images and storing the combination in memory/storage 330. Processor 310 may also acquire information of user profile icon 512 and the description of the audio guide 514. Processor 310 may then load user profile icon 512 and description 514, along with play button 516, into audio guide control 510 for display on launching page 502. Processor 310 may establish the mapping relationship between play button 516 and the audio file and corresponding VR images stored in memory/storage 330 to allow automatically playing of the audio guide and displaying the corresponding view of the VR environment.

In step 404, processor 310 may determine whether to receive, through communication interface 320 (e.g., a touchscreen, keyboard, mouse, etc.), an instruction or trigger from the user triggering audio guide control 510/520. For example, processor 310 may determine whether the user click, touch, or hold audio guide control 510/520 to initiate the audio guide. If processor 310 does not receive such an instruction or trigger, method 400 returns to step 402 following the NO branch, in which processor 310 continue waiting for the instruction or trigger (e.g., in a stand-by mode). On the other hand, after processor 310 receives such an instruction or trigger from the user, method 400 proceeds to steps 406 and 408 following the YES branch in response to the reception of the instruction or trigger. It is noted that step 406 and 408 may be performed sequentially in any order (e.g., step 406 followed by step 408 or vice versa) or, at substantially the same time.

In step 406, processor 310 may display, through communication interface 320 (e.g., display 322), a view of a 3D VR environment, such as a view of VR environment 126/136. As used herein, a view of a 3D VR environment may include at least a partial display of the 3D VR environment observed at a point position and having a field of view (FOV). Altering the view angle, direction, or performing zooming-in/out may change the FOV, thereby altering the view. In some embodiments, multiple views may be provided to the user when the user manipulate the FOV (e.g., by sliding, zooming-in, or zooming-out).

In step 408, processor 310 may play, through communication interface 320, an audio guide associated with the view displayed to the user. As discussed above, steps 406 and 408 may be performed simultaneously upon receiving the user instruction or trigger by, for example, clicking play button 516 or 520. In some embodiments, multiple views may be associated with the audio guide. As the audio guide is playing back, a sequence of views may be displayed to the user, based on a pre-recorded sequence of spatial operations to alter the view. For example, user 132 may pre-record the audio guide by inputting voice signals along with a series of spatial operations to manipulate the FOV of the view to, for example, showcase certain features. The sequence of spatial operations may also be recorded and associated with the audio guide. When the audio guide is played back, the recorded spatial sequence may also be played back, for example in synchronization with the audio guide, to provide a dynamic VR experience and to better focus on certain features of the underlying in-door environment.

During the playing of the audio guide, the user may be allowed to alter the default view associated with the audio guide that is being displayed. For example, processor 310 may detect a target operation input by the user to alter the view in step 410. In some embodiments, the target operation may include altering the FOV for observing the VR environment. For example, the user may slide the view on a touch screen in any direction (e.g., up, down, left, right, angular, or a combination thereof) to change the view direction or view angle. In another example, the user may zoom in the view (e.g., by clicking a zoom-in button or by using gesture operations such as a two-finger pinching operation) to shrink the FOV. In yet another example, the user may zoom out the view (e.g., by clicking a zoom-out button or by using gesture operations such as a two-finger pinching operation) to enlarge the FOV. Depending on applications, one or more of such FOV altering operations may be set as target operations. In response to the detection of the target operation in step 410, processor 310 may, in step 412 following the YES branch of step 410, adjust the view based on the detected target operation.

In some embodiments, the adjustment of the view may be with respect to a fixed point position within the VR environment. For example, when the target operation is a sliding operation, processor 310 may adjust the view according to the sliding direction, acceleration, speed, or other properties, but without changing the viewing point position. In other words, the view adjustment may be allowed under the condition that the user indicator (e.g., the view point) is fixed to a point position within the VR environment. In some embodiments, the fixed point position may correspond to a point position at which the view is displayed when the target operation is detected. For example, as the audio guide is playing, one or more preset views associated with the audio guide may be displayed to the user, which may be at different point positions. When the target operation is detected, processor 310 may determine the current point position at which the view is being displayed as the fixed point position and alter the view at the fixed point position without moving to another point position. For instance, when the target operation is a zoom operations (zooming in or zooming out), processor 310 may adjust the FOV to reflect the zoomed view observed at the fixed point position. In other words, during the playing of the audio guide, the user is permitted to manipulate the view to observe the VR environment with limited flexibility, namely at a fixed point position. This fixed point position may be dynamically determined, as discussed above, as the point position at the time when the target operation is detected. The fixed point position may also be one of a predetermined set, for example, corresponding to a point position at which the view is captured by camera device 110.

In some embodiments, processor 310 may restrict certain operations input by the user. For example, the fixed point position may be within a first functional space, such as a fixed point position 610 within functional space 210 shown in FIG. 6. An operation by the user to jump to another functional space while the audio guide is playing may be prohibited. Steps 414 and 416 show an exemplary process to restrict such an operation. Referring back to FIG. 4A, when processor 310 does not detect a target operation (the NO branch of step 410), method 400 may proceed to step 414, in which processor 310 may detect whether an operation to change the view from a first functional space (e.g., functional space 210 shown in FIG. 6) to a second functional space (e.g., functional space 250 shown in FIG. 6), which is different from the first functional space. If no such operation is detected, method 400 may loop back to step 410. On the other hand, if such an operation is detected by processor 310, in response to the detection, processor 310 may, in step 416, deny the operation of jumping among functional spaces and may send, through communication interface 320, an alert indicating the operation is not permitted (e.g., an audible alert output by speaker 326, a visual alert output by display 322, etc.).

Allow limited flexibility to change the view displayed on a terminal device (e.g., terminal device 120) may encourage user 122 to explore VR environment 126 while listening to the audio guide, and at the same time maintain a degree of order to prevent user 122 from losing focus. Processor 310 programmed based on exemplary method 400 improve the user experience as well as the efficiency of the VR tour.

Figure 4B:
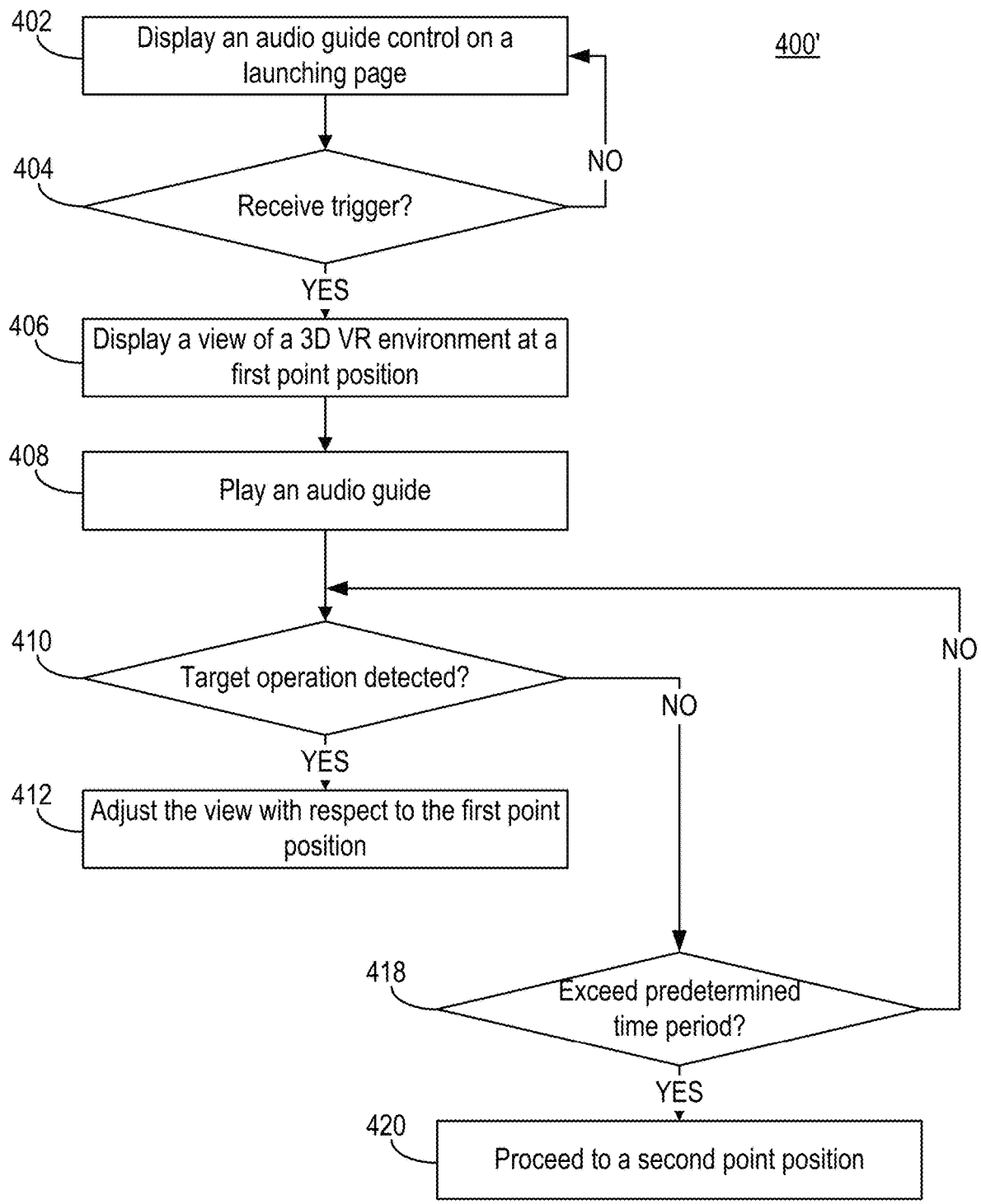

FIG. 4B illustrate another exemplary method 400' for providing a VR tour, according to embodiments of the disclosure. Method 400' is similar to method 400 in that steps 402 to 412 are the same, while steps 414 and 416 are replaced by steps 418 and 420, respectively. Accordingly, description of steps 402 to 412 of method 400' are omitted. Following the NO branch of step 410, in step 418, if processor 310 does not detect any target operation, and the waiting or standby time exceeds a predetermined time period, method 400' proceeds to step 420. If the predetermined time period has not been reached, method 400' may loop back to step 410.

In step 420, processor 310 may proceed the user indicator from the first point position associated with the audio guide to a second point position. The second point position may be the next point position along a predetermined path of the audio-guided VR tour. In this way, processor 310 may sequentially proceed through a series of point positions, with the audio guide being played along the path, to complete the VR tour.

Figure 6:
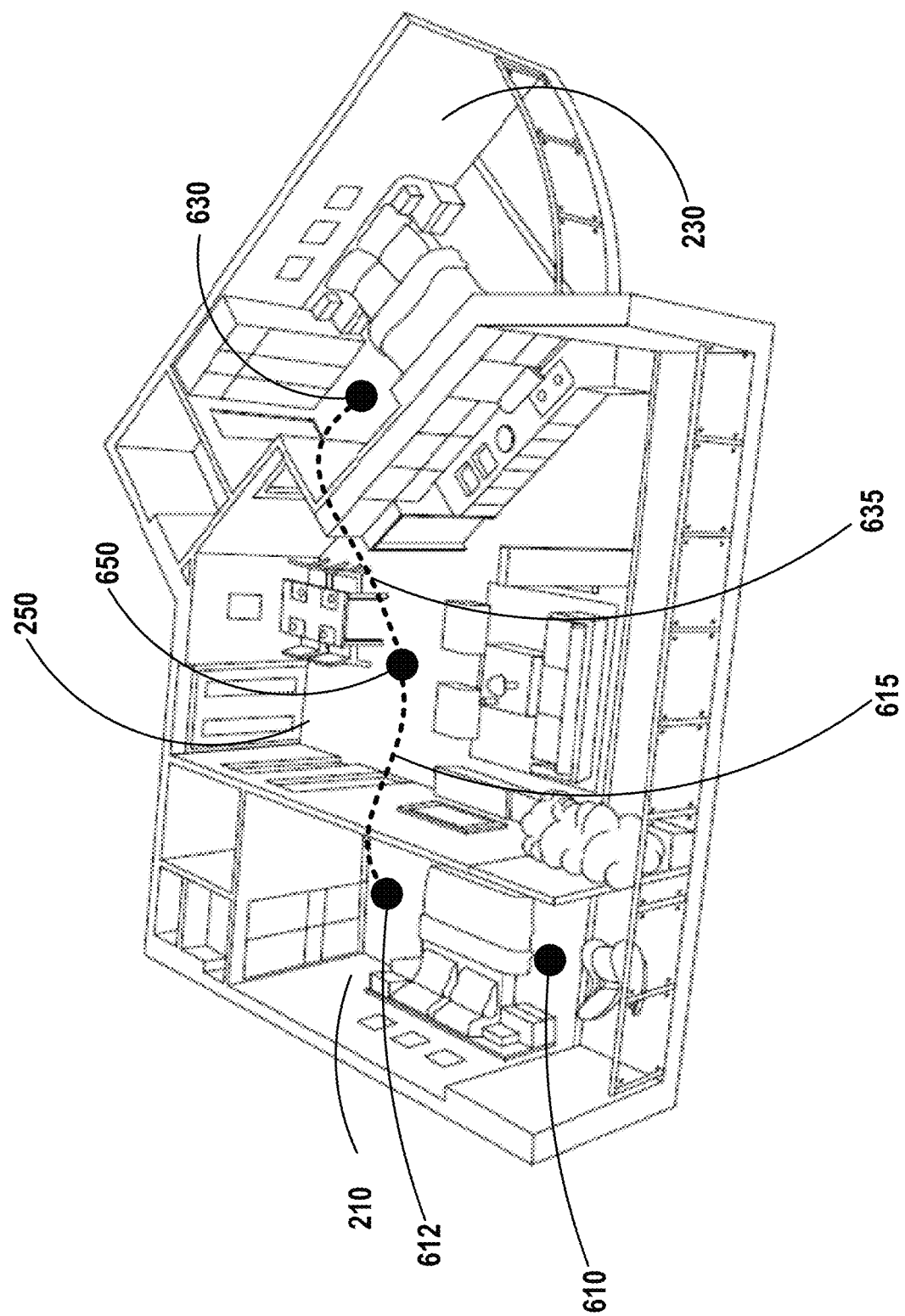
FIG. 6 illustrates an exemplary path of an in-door VR tour, according to embodiments of the disclosure.

FIG. 6 shows an exemplary procession of point positions along a path of an in-door VR tour, according to embodiments of the disclosure. A user, such as user 120, may start an audio-guided VR tour by, for example, clicking play button 516 or 520 displayed on the launching page 502. The VR tour may start by displaying a view of a VR environment, such as a VR view of functional space 210 at point position 610, along with an audio guide describing the features of functional space 210. During the playing of the audio guide, user 120 may change the view by inputting a target operation, such as a sliding or zooming operation. The view displayed may be adjusted accordingly. The adjusted view may be from the view point fixed at point position 610. During the playing of the audio guide, the point position may also change according to a predetermined sequence. For example, at a first time point, the point position may be at 610. At a second time point, the point position may proceed to 612. If the user inputs a target operation at the first time point, the view may be adjusted with respect to the fixed point position at 610. If the user inputs a target operation at the second time point, the view may be adjusted with respect to the fixed point position at 612. If the user inputs an operation attempting to change the functional space (e.g., from 210 to 250), processor 310 may deny that operation and send an alert indicating the operation is not permitted.

After a predetermined time period has passed, if processor 310 does not receive any target operation, processor 310 may proceed to the next point position along a pass and display the default view at the next point position. For example, processor 310 may proceed from point position 612 to point position 650 along pass 615. During the procession, processor 310 may display 3D VR images along pass 615 to simulate the process of moving along the path. In some embodiments, there may be multiple point positions along pass 615. Processor 310 may proceed to each point position along pass 615 and display the corresponding VR images at each point position. The procession may be at a constant speed from point position 612 to each intermediate point positions and finally to point position 650. The procession may be from one functional space to another functional space (e.g., from point position 612 in functional space 210 to point position 650 in functional space 250), or within the same functional space (e.g., from point position 610 to point position 612, both in functional space 210). Similarly, after a predetermined time period, processor 310 may again proceed from point position 650 to point position 630 along a path 635 and to display the 3D VR images along the pass at a predetermined speed.

Another aspect of the disclosure is directed to a non-transitory computer-readable medium storing instructions which, when executed, cause one or more processors to perform the methods, as discussed above. The computer-readable medium may include volatile or non-volatile, magnetic, semiconductor, tape, optical, removable, non-removable, or other types of computer-readable medium or computer-readable storage devices. For example, the computer-readable medium may be the storage device or the memory module having the computer instructions stored thereon, as disclosed. In some embodiments, the computer-readable medium may be a disc or a flash drive having the computer instructions stored thereon.

It will be apparent to those skilled in the art that various modifications and variations can be made to the disclosed system and related methods. Other embodiments will be apparent to those skilled in the art from consideration of the specification and practice of the disclosed system and related methods.

It is intended that the specification and examples be considered as exemplary only, with a true scope being indicated by the following claims and their equivalents.

The invention claimed is:

1. A system for providing a virtual reality (VR) tour, comprising:
    a communication interface configured to receive input from a user and to output media contents;
    a memory storing computer-readable instructions; and
    at least one processor coupled to the communication interface and the memory, wherein the computer-readable instructions, when executed by the at least one processor, cause the at least one processor to perform operations comprising:
        displaying, through the communication interface, a view of a VR environment;
        playing, through the communication interface, an audio guide associated with the view;
        playing back a sequence of pre-recorded spatial operations to automatically alter the view in synchronization with the playing of the audio guide;
        detecting, during the playing of the audio guide, a target operation input by the user through the communication interface to further alter the view that is being automatically altered; and
        in response to the detection of the target operation, adjusting, based on the detected target operation, the view with respect to a fixed point position within the VR environment, wherein the fixed point position is not allowed to be changed to any other point position within the VR environment.

2. The system of claim 1, wherein the fixed point position corresponds to a first point position at which the view is displayed when the target operation is detected.

3. The system of claim 1, wherein the fixed point position corresponds to a first point position at which the view is captured by a VR image capturing device.

4. The system of claim 1, wherein the target operation comprises altering a field-of-view (FOV) for observing the VR environment.

5. The system of claim 4, wherein the operations comprise:
 displaying, based on the FOV, the adjusted view observed at the fixed point position.

6. The system of claim 1, wherein the operations comprise:
 detecting, during the playing of the audio guide, an operation input by the user to change the view from a first functional space of the VR environment to a second function space of the VR environment, the second functional space being different from the first functional space; and
 in response to the detection of the operation, sending, through the communication interface, an alert indicating the operation is not permitted because of the playing of the audio guide.

7. The system of claim 1, wherein the target operation comprises at least one of a sliding operation, a zooming-in operation, or a zooming-out operation.

8. The system of claim 1, wherein the operations comprise:
 displaying, through the communication interface, an audio guide control associated with the audio guide on a launching page of the VR tour, the launching page comprising an image associated with the VR tour;
 receiving, through the communication interface, an instruction from the user triggering the audio guide control; and
 in response to the reception of the instruction, automatically playing the audio guide and displaying the view of the VR environment associated with the audio guide.

9. The system of claim 8, wherein the audio guide control comprises at least one of an image of an audio guide narrator, a description of the audio guide, or a play button.

10. A method for providing a virtual reality (VR) tour, comprising:
 displaying, through a communication interface, a view of a VR environment;
 playing, through the communication interface, an audio guide associated with the view;
 playing back a sequence of the pre-recorded spatial operations to automatically alter the view in synchronization with the playing of the audio guide;
 detecting, during the playing of the audio guide, a target operation input by a user to further alter the view that is being automatically altered; and
 in response to the detection of the target operation, adjusting, based on the detected target operation, the view with respect to a fixed point position within the VR environment, wherein the fixed point position is not allowed to be changed to any other point position within the VR environment.

11. The method of claim 10, wherein the fixed point position corresponds to a first point position at which the view is displayed when the target operation is detected.

12. The method of claim 10, wherein the fixed point position corresponds to a first point position at which the view is captured by a VR image capturing device.

13. The method of claim 10, wherein the target operation comprises altering a field-of-view (FOV) for observing the VR environment.

14. The method of claim 13, comprising:
 displaying, based on the FOV, the adjusted view observed at the fixed point position.

15. The method of claim 10, comprising:
 detecting, during the playing of the audio guide, an operation input by the user to change the view from a first functional space of the VR environment to a second function space of the VR environment, the second functional space being different from the first functional space; and
 in response to the detection of the operation, sending, through the communication interface, an alert indicating the operation is not permitted because of the playing of the audio guide.

16. The method of claim 10, wherein the target operation comprises at least one of a sliding operation, a zooming-in operation, or a zooming-out operation.

17. The method of claim 10, comprising:
 displaying, through the communication interface, an audio guide control associated with the audio guide on a launching page of the VR tour, the launching page comprising an image associated with the VR tour;
 receiving, through the communication interface, an instruction from the user triggering the audio guide control; and
 in response to the reception of the instruction, automatically playing the audio guide and displaying the view of the VR environment associated with the audio guide.

18. The method of claim 17, wherein the audio guide control comprises at least one of an image of an audio guide narrator, a description of the audio guide, or a play button.

19. A non-transitory computer-readable medium storing instructions that, when executed by at least one processor, cause the at least one processor to perform a method for providing a virtual reality (VR) tour, the method comprising:
 displaying, through a communication interface, a view of a VR environment;
 playing, through the communication interface, an audio guide associated with the view;
 playing back a sequence of the pre-recorded spatial operations to automatically alter the view in synchronization with the playing of the audio guide;
 detecting, during the playing of the audio guide, a target operation input by a user to further alter the view that is being automatically altered; and
 in response to the detection of the target operation, adjusting, based on the detected target operation, the view with respect to a fixed point position within the VR environment, wherein the fixed point position is not allowed to be changed to any other point position within the VR environment.

20. The non-transitory computer-readable medium of claim 19, wherein the method comprises:
 detecting, during the playing of the audio guide, an operation input by the user to change the view from a first functional space of the VR environment to a second function space of the VR environment, the second functional space being different from the first functional space; and
 in response to the detection of the operation, sending, through the communication interface, an alert indicating the operation is not permitted because of the playing of the audio guide.

* * * * *